Figure 1:
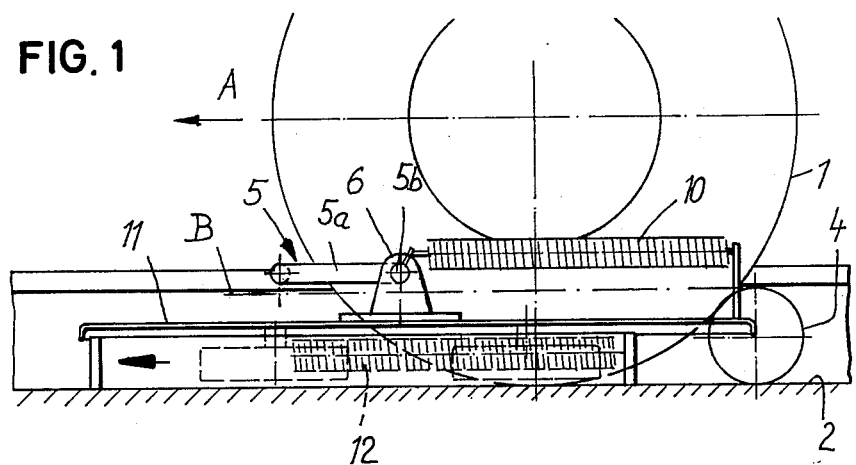
Figure 2:
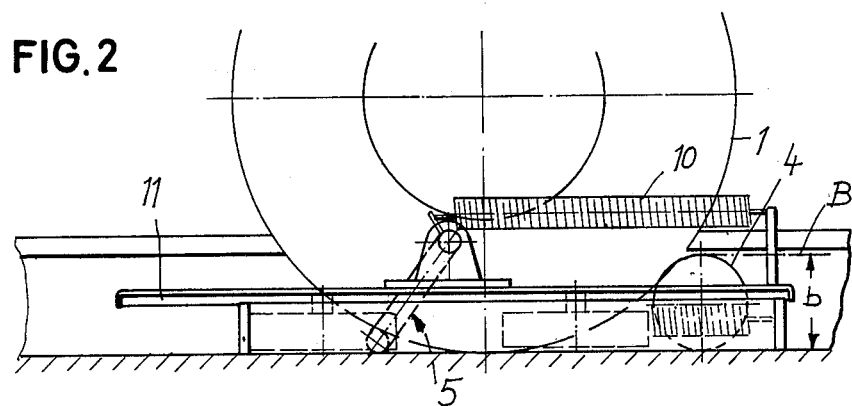
Figure 3:
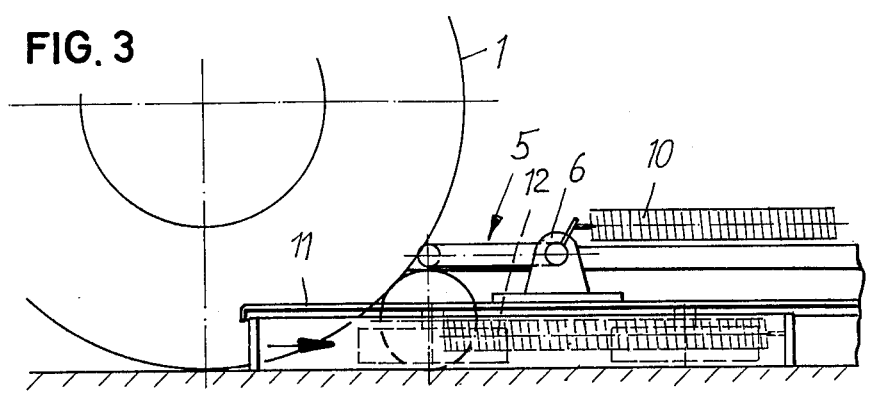
Figure 4:
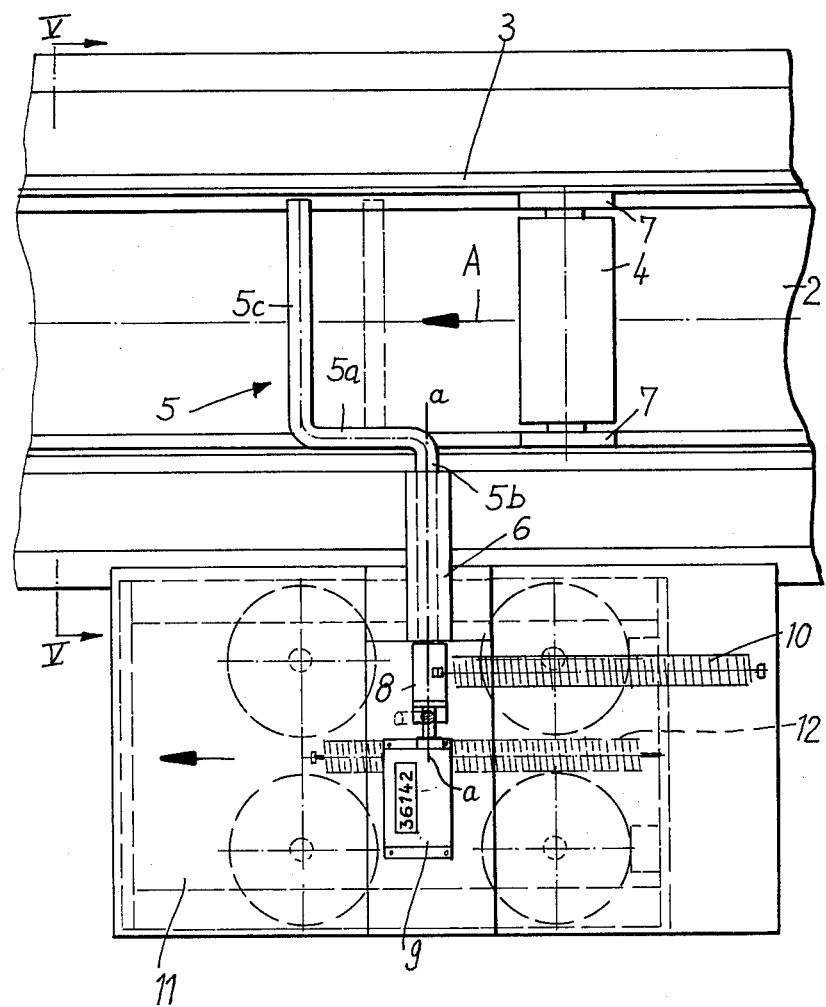
Figure 5:
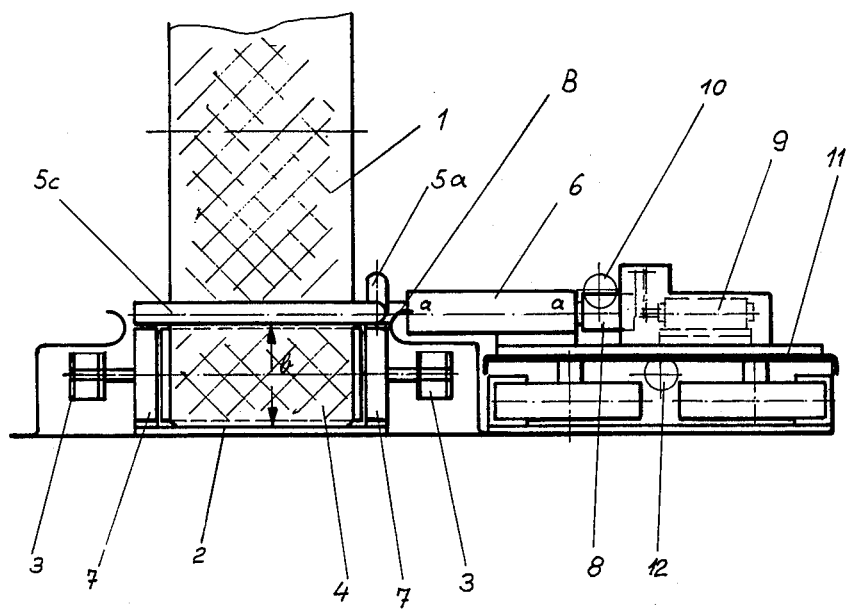

United States Patent [19]

Weigele

[11] 4,092,759
[45] June 6, 1978

[54] COUNTING MECHANISM FOR A MOTOR VEHICLE WASHING PLANT

[76] Inventor: Gebhard Weigele, Am Schönblickla, 8901 Tafertingen, Germany

[21] Appl. No.: 762,748

[22] Filed: Jan. 26, 1977

[30] Foreign Application Priority Data

Feb. 23, 1976 Germany .............................. 7605361

[51] Int. Cl.² ............................ B61L 1/16; B60S 3/04
[52] U.S. Cl. .................................. 15/257; 15/DIG. 2; 104/1 R; 104/172 B; 235/98 B
[58] Field of Search ................ 15/DIG. 2, 53 R, 257, 15/53 A, 53 AB, 53 B, 97; 134/45, 123; 235/98 B, 91 R, 99 A; 200/61.41; 104/172, 1 R; 198/503

[56] References Cited

U.S. PATENT DOCUMENTS 2,675,964   4/1954   Berezny .......................... 235/99 A X

FOREIGN PATENT DOCUMENTS 2,100,575   6/1973   Germany .............................. 235/98 B Primary Examiner—Edward L. Roberts
Attorney, Agent, or Firm—Blanchard, Flynn, Thiel, Boutell & Tanis

[57] ABSTRACT

A counting mechanism for a motor vehicle washing plant. A vertically movable switching member is located in the track in the washing plant and in the path of the vehicle wheel located in the track. The switching member is movable vertically upon engagement by a vehicle wheel and is urged downwardly into engagement with the bottom of the track. After the wheel has passed over the switching member, structure is provided for returning the switching member to its initial position. The second vehicle wheel will then engage the switching member a second time and urge it downwardly into engagement with the bottom of the track. This second engagement will produce an indexing of a stroke counter to register a counting unit thereon. As a result, it will not be possible to control or thwart, in an unauthorized manner, the counting mechanism for counting cars actually washed in the washing plant.

5 Claims, 5 Drawing Figures

UNITED STATES PATENT AND TRADEMARK OFFICE
CERTIFICATE OF CORRECTION

PATENT NO.   :   4 092 759
DATED        :   June 6, 1978
INVENTOR(S)  :   Gebhard Weigele It is certified that error appears in the above-identified patent and that said Letters Patent are hereby corrected as shown below:

Inventor's address should read:

---Am Schönblick 1a, 8901 Täfertingen, Germany---.

Column 4, line 13; change "spacing (b)" to ---side---.

Column 4, line 24; after "spacing" insert ---(b)---.

Signed and Sealed this

Nineteenth Day of December 1978

[SEAL]

Attest:

RUTH C. MASON
Attesting Officer

DONALD W. BANNER
Commissioner of Patents and Trademarks